May 30, 1950        G. O. ELIASSON        2,509,912
SEALING DEVICE
Filed Aug. 7, 1947
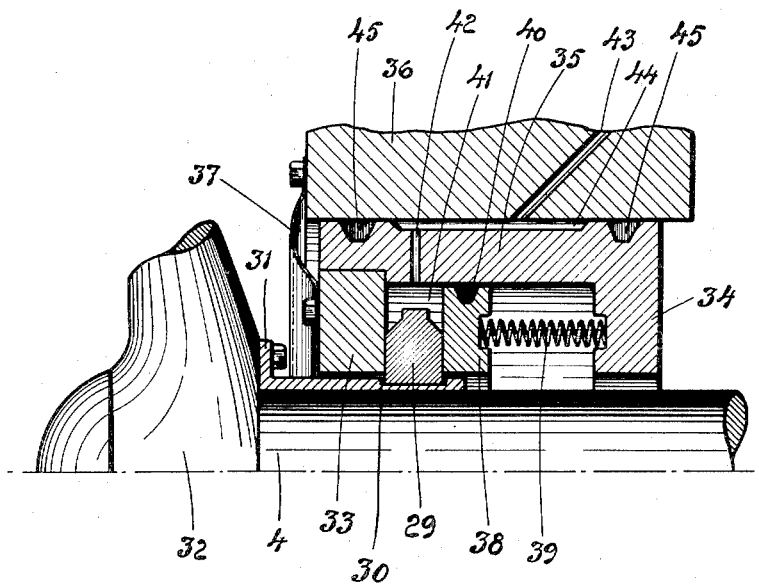
Inventor:
Gustaf Oscar Eliasson,
By Pierce, Scheffler & Parker,
Attorneys.

Patented May 30, 1950

2,509,912

UNITED STATES PATENT OFFICE 2,509,912

SEALING DEVICE

Gustaf Oscar Eliasson, Goteborg, Sweden

Application August 7, 1947, Serial No. 767,219
In Sweden August 19, 1944

2 Claims. (Cl. 286—9)

The present invention relates to propeller shafts of vessels and more particularly to the passage of the shaft through the hull of the vessel.

One object of the invention is to provide sealing means for the shaft so that water is prevented to leak in and come in contact with the shaft bearing. By such sealing means it will be possible to apply bearing of arbitrary type, for example ball bearings.

A further object of the invention is to provide sealing means, which permit the shaft to vary in length by change of temperature.

The invention is principally characterized in that two sealing devices are disposed at a distance from each other to constitute a sealed space around the propeller shaft, and in that the sealing device disposed nearest the propeller screw comprises a sealing body formed as a ring-shaped valve, which is pressed against a seat by resilient means, and further in that conduits are arranged to supply a pressure fluid, preferably pressure air, to the space the pressure of which may be fitted to reduce the pressure of the valve against the seat.

In the accompanying drawing, the figure is a partial sectional view illustrating the invention.

The sealing device shown is specially arranged in consideration of the longitudinal expansion of the propeller shaft by rise of temperature which expansion sometimes reaches about one inch or more. The device comprises a sealing ring 29, the sliding faces of which are substantially perpendicular to the propeller shaft 4. The ring 29 is disposed in a groove 30 at the outside of a sleeve 31 on the shaft 4, to which the sleeve is firmly connected by the propeller screw 32. In order to make the application into the groove 30 of the ring 29 possible the ring is made of two or more parts which are fixed to each other by suitable means. Furthermore, the ring 29 is disposed between the flanges 33 and 34 of a ring 35 which has U-shaped cross section and is placed on the shaft 4. The one sliding face of the ring 29 engages the inside of the flange 33, which constitutes the proper valve body. To make the application of the ring 29 possible the flange 33 is detachably fastened to the ring 35.

The ring 35 is slidable into a stationary bearing member 36. At that side of the bearing which is nearest the propeller screw is situated a plaited membrane 37 which at its outer edge is connected with the bearing member 36 and at its inner edge with the flange 33. The membrane 37 is arranged to hold the ring 35 in a certain longitudinal position and to prevent the ring 35 from being turned relatively to the part 36. Furthermore, the membrane prevents that water enters between the sliding faces of the ring 35 and the bearing members 36.

The opposite sliding face of the ring 29 engages a ring 38 between the flanges 33, 34, which ring 38 is pressed against the ring 29 by means of springs 39. To effect a good sealing between the rings 35 and 38 the ring 38 has a packing ring 40 at its outer cylindrical face. Pressure fluid is admitted into a space 41 between the flange 33 and the ring 38 by one or more channels 42 in the ring 35. These channels 42 communicate with a channel 43 in the bearing member 36 by means of a groove 44 or the like in the outer face of the ring 35. To prevent leakage of the pressure fluid between the sliding faces of the bearing member 36 and the ring 35 packing rings 45 are disposed at both sides of the groove 44.

When the pressure in the space 41 is increased by admittance of pressure fluid the ring 38 is pressed in the direction against the flange 34 and the pressure of the ring 38 against the ring 29 is reduced. At the same time the ring 35 is moved in the direction against the propeller screw and also the pressure between the flange 33 and the ring 29 is reduced.

The sealing valve device 29, 33, 38 is not subject to the normal sealing pressure during rotation of the propeller shaft but the friction between the sliding parts can be reduced to a minimum. On the other side, when the shaft has come to a standstill the valve body is pressed against the valve seat with the total sealing pressure. The air leakage during the rotation of the shaft can be kept at such a small amount that it is of no economical importance.

The embodiment illustrated in the drawings is to be considered only as examples of the invention. Thus, in the specification there has been mentioned only pressure air as an example of a suitable pressure fluid. Though pressure air in most cases is to be preferred as a cheap pressure fluid it is often possible to use other fluids, which certainly must not be of such a nature that the bearing will be injured. Among liquids preferably lubricating oil is fitted for use.

What I claim is:

1. Sealing box for the propeller shaft at the passage through the hull of a ship comprising a first ring secured to the propeller shaft, a second ring slidably mounted in the hull and surrounding said shaft at one side of said first ring, a third ring axially displaceable and surrounding said shaft at the other side of said first ring, resilient means between said second and third rings to press said rings against said first ring, packing means at the periphery of said second and third rings, a conduit for supplying pressure fluid to the chamber formed between said second and third rings, and a plaited ring-shaped membrane having its outer edge tightly secured to the hull and its inner edge tightly secured to said second ring.

2. Sealing box for the propeller shaft at the passage through the hull of a ship comprising a first ring secured to the propeller shaft, a second ring fastened to a sleeve slidably mounted in the hull and surrounding said shaft, said second ring projecting inwardly from said sleeve and surrounding said shaft at one side of said first ring, a third ring axially displaceable in said sleeve and surrounding said shaft at the other side of said first ring, resilient means located between said sleeve and said third ring and adapted to press said third ring towards said second ring, thereby causing said rings to press on both sides of said first ring, a ringshaped groove in the outer face of said sleeve, packing means on each side of said groove, packing means at the periphery of said third ring, a channel connecting said groove with a ringshaped chamber formed between said second and third rings, a conduit for supplying pressure fluid to said groove and a plaited ringshaped membrane having its outer edge tightly secured to the hull and its inner edge tightly secured to said second ring.

GUSTAF OSCAR ELIASSON.

REFERENCES CITED

The following references are of record in the file of this patent:

UNITED STATES PATENTS

| Number | Name | Date |
|---|---|---|
| 674,885 | Stratton | May 28, 1901 |
| 926,803 | Braddock | July 6, 1909 |
| 1,561,426 | Fischbacher | Nov. 10, 1925 |
| 1,764,701 | Spreen | June 17, 1930 |
| 1,876,520 | Newkirk et al. | Sept. 6, 1932 |
| 2,265,953 | Mortensen et al. | Dec. 9, 1941 |